J. R. Brown,
Wrench.
No. 65,162.      Patented May 28, 1867.

Witnesses.
Geo. H. Andrews
Samuel N. Piper

Inventor
Jas. R. Brown
by his attorney
R. H. Eddy

United States Patent Office.

JAMES R. BROWN, OF BOSTON, ASSIGNOR TO HIMSELF AND W. S. LOVELL, OF CAMBRIDGEPORT, MASSACHUSETTS.

Letters Patent No. 65,162, dated May 28, 1867.

IMPROVEMENT IN PIPE-WRENCHES.

*The Schedule referred to in these Letters Patent and making part of the same.*

TO ALL PERSONS TO WHOM THESE PRESENTS SHALL COME:

Be it known that I, JAMES R. BROWN, of Boston, in the county of Suffolk, and State of Massachusetts, have invented a new and useful Improvement in Pipe-Tongs; and do hereby declare the same to be fully described in the following specification, and represented in the accompanying drawings, of which—

Figure 2:
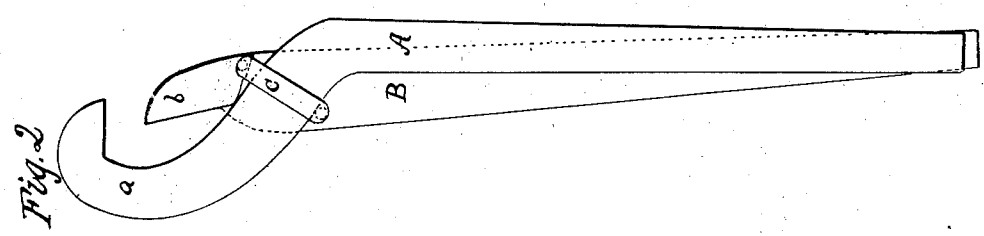
Figure 1:
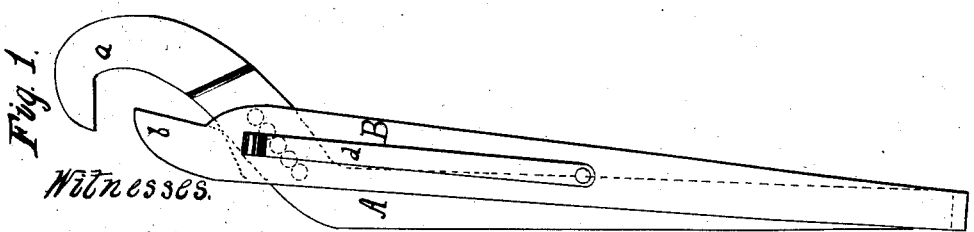

Figures 1 and 2 are side views.

Figure 3:
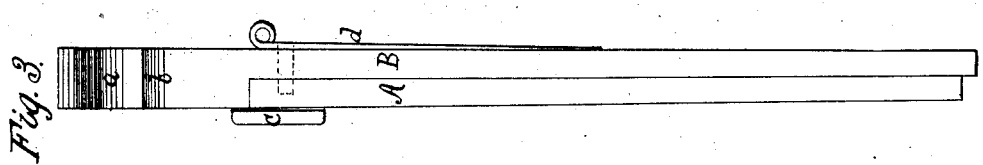

Figure 3, an edge view; and

Figure 4:
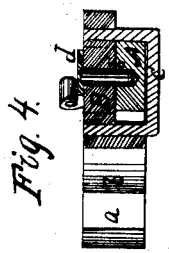

Figure 4, a transverse section of them.

Figure 5:

Figure 5, a longitudinal section of the series of adjusting holes of the jaw-levers.

In such drawings, A is the hook-jaw lever, and B the tooth-jaw lever. The shorter arm of the former terminates in a hook, $a$, and that of the latter in a tooth, $b$. These levers cross one another, and are held together by a clasp or staple, C, which receives one of the levers, and is inserted and fixed in the other of them, such staple being arranged as represented. A series of holes, $b'$ $b'$ $b'$, is made through one of the levers about where it goes through the staple. A fulcrum-pin, $c$, projecting from a spring, $d$, fixed to the other lever, extends through a hole in such lever, and enters one of the holes $b'$ of the other lever. By withdrawing the fulcrum-pin from the hook-jaw lever, such lever may be moved in the staple, so as to carry its hook either nearer to or farther from the tooth of the other lever, as circumstances may require, after which the fulcrum-pin is to be inserted in the next nearest hole $b'$. Such pin, its spring and the staple, serve to keep the levers in connection, and to enable one of them to be turned on the pin, so as to open their jaws apart and close them upon a pipe or rod when between them.

I do not claim a pair of pipe-tongs as made with an adjustable fulcrum, in order that one jaw may be adjusted nearer to or farther from the other, but what I do claim as my improvement, is—

The combination of the staple or clasp, the series of holes, and the fulcrum-pin and its spring, and their arrangement with the two crossed jaw-levers, substantially in manner as specified.

JAMES R. BROWN.

Witnesses:
R. H. EDDY,
F. P. HALE, Jr.